(12) United States Patent
Barenbrug

(10) Patent No.: US 6,513,827 B1
(45) Date of Patent: Feb. 4, 2003

(54) BUGGY

(75) Inventor: Machiel Gerardus Theodorus Marie Barenbrug, Amsterdam (NL)

(73) Assignee: Royalty Bugaboo Sarl, Luxembourg (LU)

(*) Notice: Subject to any disclaimer, the term of this patent is extended or adjusted under 35 U.S.C. 154(b) by 0 days.

(21) Appl. No.: 09/674,029

(22) PCT Filed: Jul. 23, 1999

(86) PCT No.: PCT/NL99/00476

§ 371 (c)(1),
(2), (4) Date: Oct. 25, 2000

(87) PCT Pub. No.: WO00/06437

PCT Pub. Date: Feb. 10, 2000

(51) Int. Cl.[7] ............................. B62B 7/12; B62B 7/14; F16D 1/108

(52) U.S. Cl. ................... 280/648; 280/647; 280/643; 403/83

(58) Field of Search .................. 280/647, 642, 280/643, 648, 650, 653, 7.15, 62, 31, DIG. 6; 403/83, 84, 87, 93, 98

(56) References Cited

U.S. PATENT DOCUMENTS

| | | | | |
|---|---|---|---|---|
| 3,779,655 A | * | 12/1973 | Toyota | 403/93 |
| 4,191,397 A | * | 3/1980 | Kassai | 280/647 |
| 4,216,974 A | * | 8/1980 | Kassai | 280/42 |
| 4,412,688 A | * | 11/1983 | Giordani | 280/642 |
| 4,602,889 A | * | 7/1986 | Mu-Shan | 403/83 |
| 4,634,177 A | * | 1/1987 | Meeker | 297/250 |
| 4,645,371 A | * | 2/1987 | Wang | 403/83 |
| 4,834,403 A | * | 5/1989 | Yanus et al. | 280/30 |
| 5,028,061 A | * | 7/1991 | Hawkes | 403/83 |
| 5,257,799 A | | 11/1993 | Richard et al. | |
| 5,527,096 A | * | 6/1996 | Shimer | 297/327 |
| 5,772,279 A | * | 6/1998 | Johnson, Jr. | 297/130 |
| 5,865,447 A | * | 2/1999 | Huang | 280/30 |
| 6,286,844 B1 | * | 9/2001 | Cone, II et al. | 280/47.41 |

FOREIGN PATENT DOCUMENTS

EP 0 663 332 7/1995

* cited by examiner

Primary Examiner—Brian L. Johnson
Assistant Examiner—Jeff Restifo
(74) Attorney, Agent, or Firm—Young & Thompson

(57) ABSTRACT

The buggy includes a frame with front and rear wheels, a pull and push bar, and front wheel bars and rear wheel bars that support the front and rear wheels and which are connected to the pull and push bar, and a seat accommodated in the frame. The buggy is provided on either side with a coupling device for the rotatable connection of the pull and push bar and the front wheel and rear wheel bars, this coupling device being equipped for the detachable fitting of the seat.

8 Claims, 9 Drawing Sheets

BUGGY

FIELD OF THE INVENTION

The invention concerns a buggy comprising a frame with front and rear wheels, pull and push bar, and front wheel bars and rear wheel bars that support the front and rear wheels and that are connected to the pull and push bar, and a seat accommodated in the frame.

Such a buggy is generally known from practice. The purpose of the invention is to construct a buggy that is highly versatile in use and meets all the safety requirements that are made of buggies. These requirements of versatility in use and safety are at odds with one another. Increasing the versatility usually requires attention by the user for the way in which the buggy is used.

SUMMARY OF THE INVENTION

The invention aims to provide a buggy that is inherently safe, while still being extremely versatile in use. A further aim of the buggy according to the invention is its drastic simplification. This is achieved with the buggy according to the invention in that the buggy is provided on either side with a coupling device for the rotatable connection of the pull and push bar and the front wheel and rear wheel bars, this coupling device being equipped for the detachable fitting of the seat.

In a certain aspect of the invention the buggy has been designed so that it essentially has two positions for use, in a first position the front and rear wheels being placed apart and in a second position the front and rear wheels being placed close together. This latter position is also called the wheelbarrow position.

The versatility of the buggy according to the invention manifests itself in that in the first position for use the seat can be fitted in two ways, firstly by the seat being fined facing the front and secondly by the seat being fitted facing the rear.

For safety reasons the buggy is preferably made so that in the second position for use the seat can only be fitted with its back towards the front and rear wheels.

An advantageous form of construction of the buggy according to the invention is characterized by the coupling device being made up of interconnected rotatable discs that are connected as the case may be to the pull and push bar and the front and rear wheel bars, in the first and the second positions for use the said discs forming at least one recess that is suitable for taking a projection that is provided on the seat. One of the effects this has is that by fitting the seat the projection slots into a recess formed by the discs and the discs are secured against mutual rotation. A further effect is that the frame is only collapsible when the seat has been removed. This of course serves safety.

It is preferable that in the first position for use two recesses are formed that are suitable for taking the projection and that in the second position for use one recess is formed that is located in such a way that the seat can only be fitted with its back towards the front and rear wheels. On the one hand this meets the wish to provide a buggy with great versatility and on the other the requirement to make the buggy completely safe to use in spite of this versatility. In the second position for use in particular, in other words the wheelbarrow position, there could be a risk in the user losing contact with the pull and push bar. In this case the seat is fitted in such a way that it will land on the ground safely and with a low drop height.

It is also desirable that the coupling device and the seat are equipped with a male and female connection. This guarantees a simple and secure fitting of the seat in the frame.

It is also preferable that the seat is provided on either side with a lockable hinge and that effectuation of the male and female connection makes the hinge adjustable to a predetermined number of selected intermediate positions. In this way the seat can be set to the desired position in the frame, white, if the seat is used separately from the frame, the hinge is released for rotation so that it can be positioned in such a way that a safe placement of the seat on the ground is provided. This is achieved in the form of construction that is characterized by the hinge being connected to a part of the male and female connection that in a first positron of the hinge essentially runs diagonally in relation to the back of the seat and extends beyond the back of the seat. In a second position of the hinge this part essentially runs parallel to the back of the seat. If the male and female connection is broken, the hinge can be rotated between the first position and the second position.

The construction is preferably such that effectuation of the male and female connection adjusts a pawl incorporated into the hinge of the seat which releases the hinge for rotation.

BRIEF DESCRIPTION OF THE DRAWINGS

The invention will now be explained in detail with reference to the drawing which In FIGS. 1 and 2 shows the buggy according to the invention in the first position for use, In FIG. 3 shows the buggy according to the invention in the second position for use, In FIG. 4 shows separately from one another the frame and the seat of the buggy according to the invention, In FIGS. 5A and 5B shows the seat with the hinge connected to it in its two possible positions, In FIGS. 6 and 7 shows in detail a coupling device of the buggy according to the invention with the seat not fitted and fitted respectively, In FIG. 8 shows a coupling device of the buggy according to the invention in the wheelbarrow position and In FIGS. 9A and 9B shows a side and front view respectively of a section of the male and female connection of the seat and the coupling device of the buggy according to the invention.

DETAILED DESCRIPTION OF THE INVENTION

Figure 1:
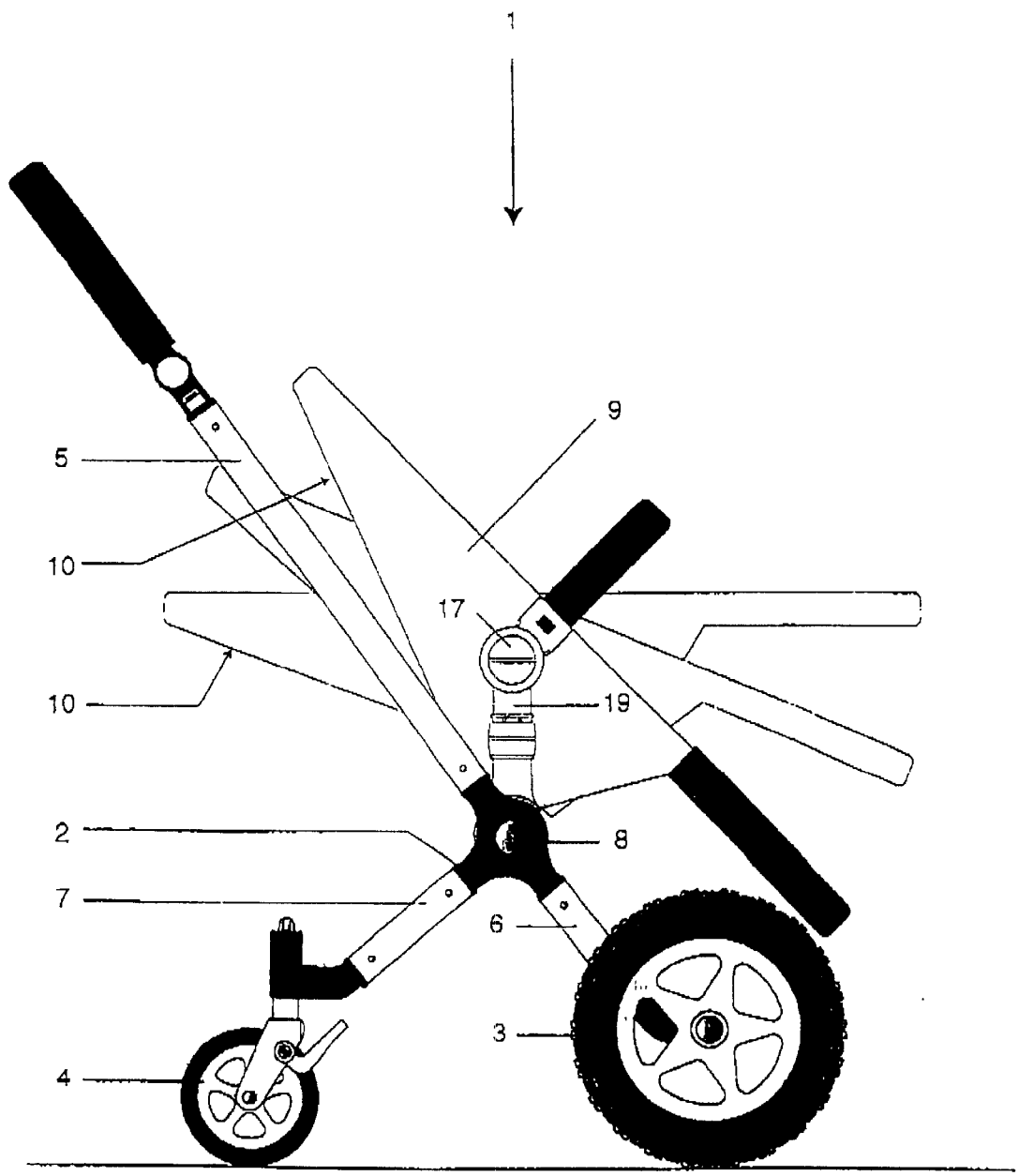

Like reference numbers used in the figures refer to the same parts. FIGS. 1 to 4 show the buggy 1, which comprises a frame 2 with front wheels 3 and rear wheels 4, a pull and push bar 5, front wheel bars 6 and rear wheel bars 7, which support the front wheels 3 and rear wheels 4 and which are connected to the pull and push bar 5 by means of a coupling device 8.

Figure 4:
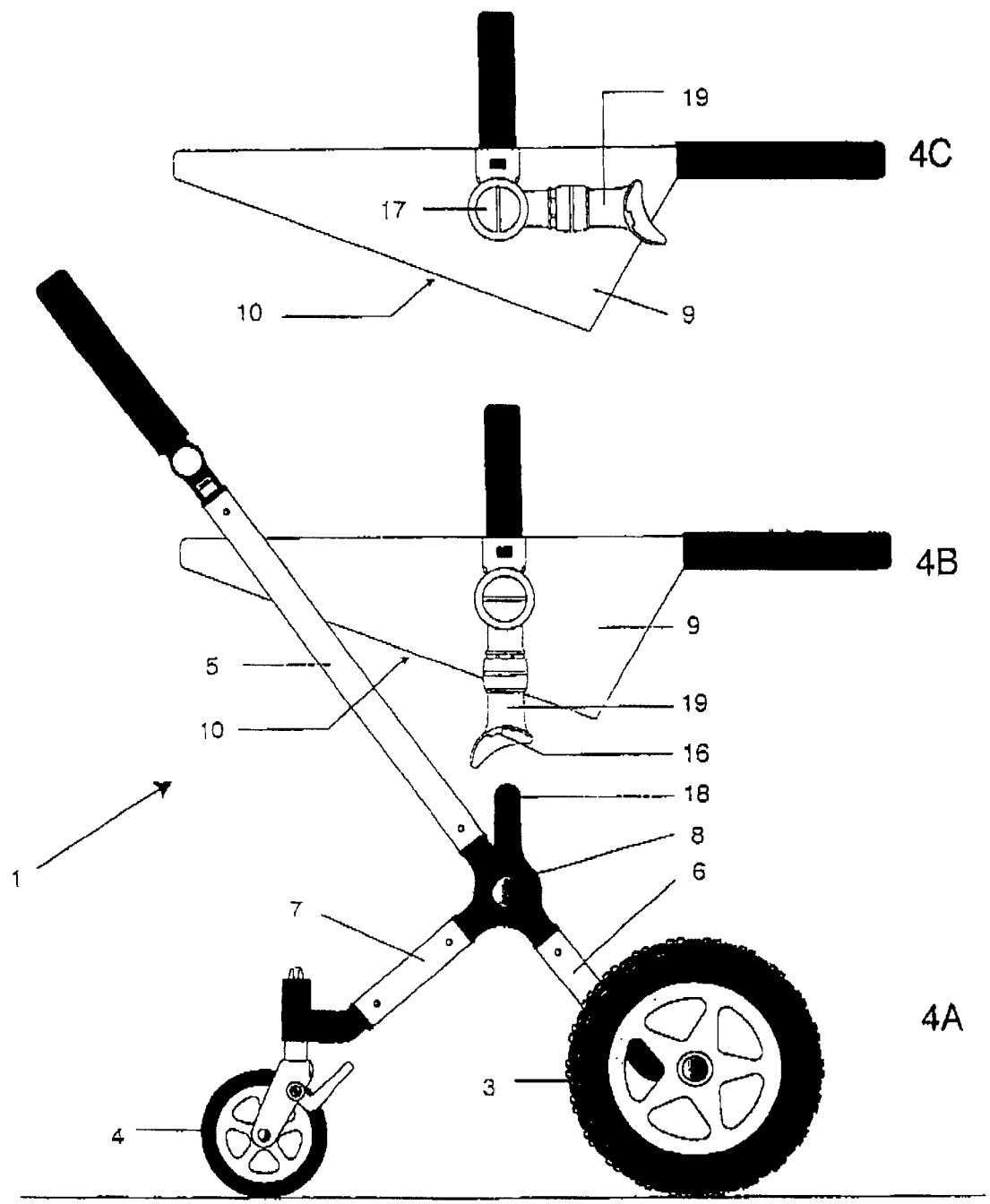

The buggy 1 also comprises an adjustable seat 9. The buggy 1 is provided on either side with a coupling device 8 by which the rotatable connection of the pull and push bar 5 is provided in respect of the front wheel bars 6 and rear wheel bars 7. The coupling device 8 is also equipped for the detachable fitting of the seat 9 as shown in FIG. 4. This will be explained in further detail below.

The buggy 1 essentially has two positions for use. In a first position, as shown in FIGS. 1 and 2, the front wheels 3 and rear wheels 4 are placed apart and in a second position, as shown in FIG. 3, the front and rear wheels are placed close together.

Figure 2:
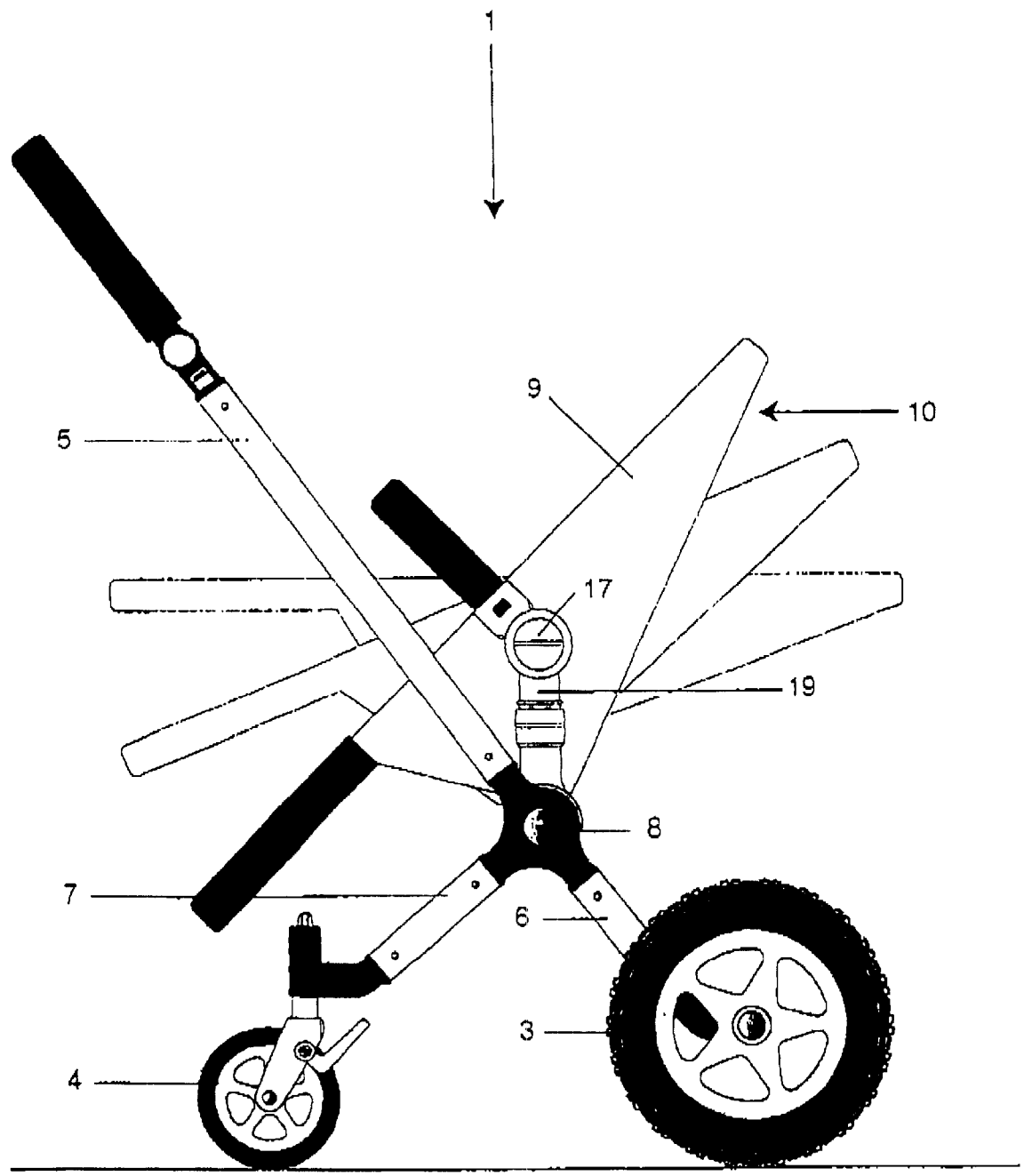

FIGS. 1 and 2 show that the seat 9 can be fitted in two ways. In the first the seat 9 is fitted facing the front. This is shown in FIG. 1.

In the second, as shown in FIG. 2, the seat 9 is fitted facing the rear.

Figure 3:
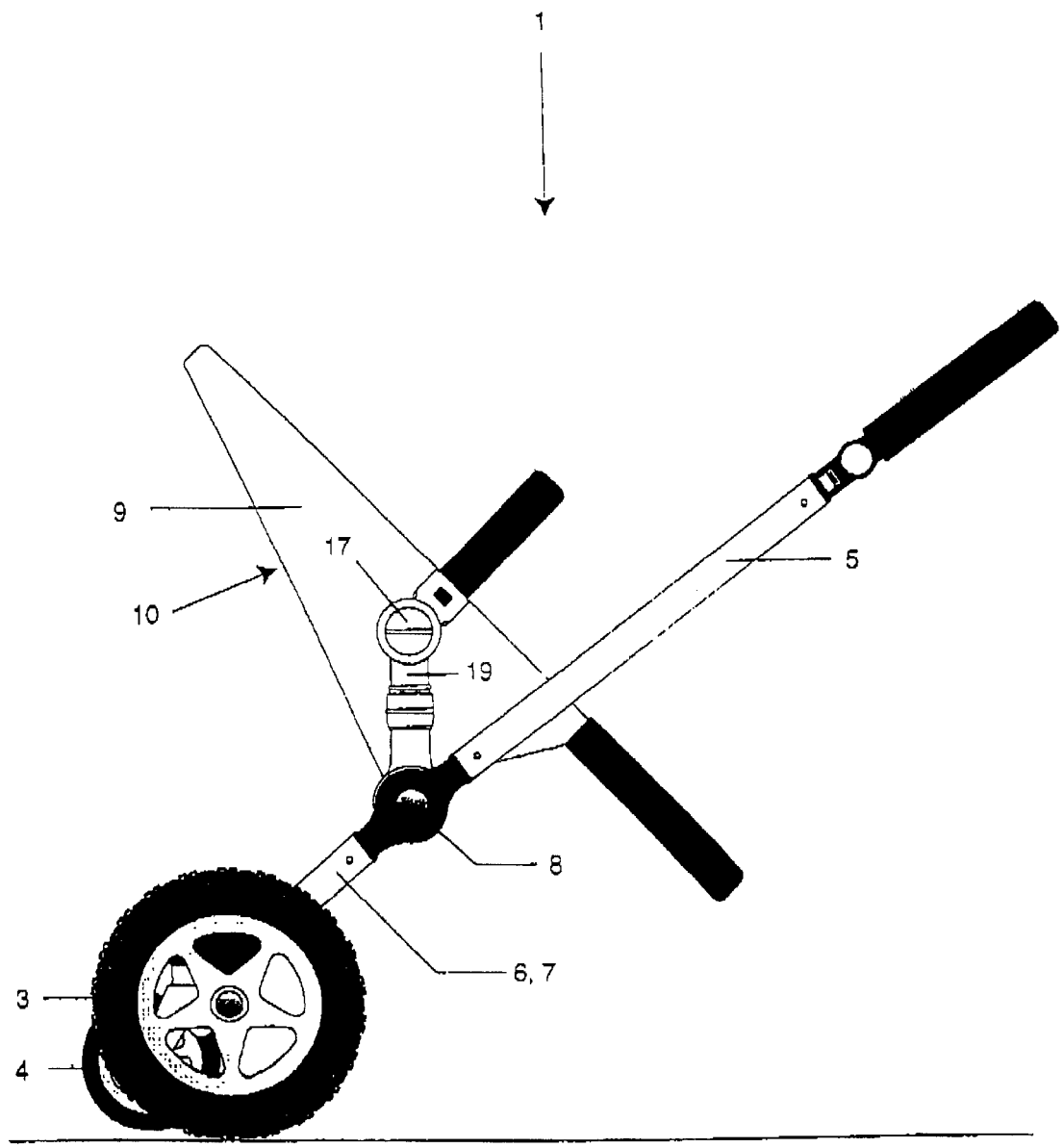

FIG. 3 shows that in the second position for use of the buggy 1, that is the wheelbarrow position, the seat 9 can only be fitted with the back 10 of the seat 9 towards the front and rear wheels.

Figure 6:
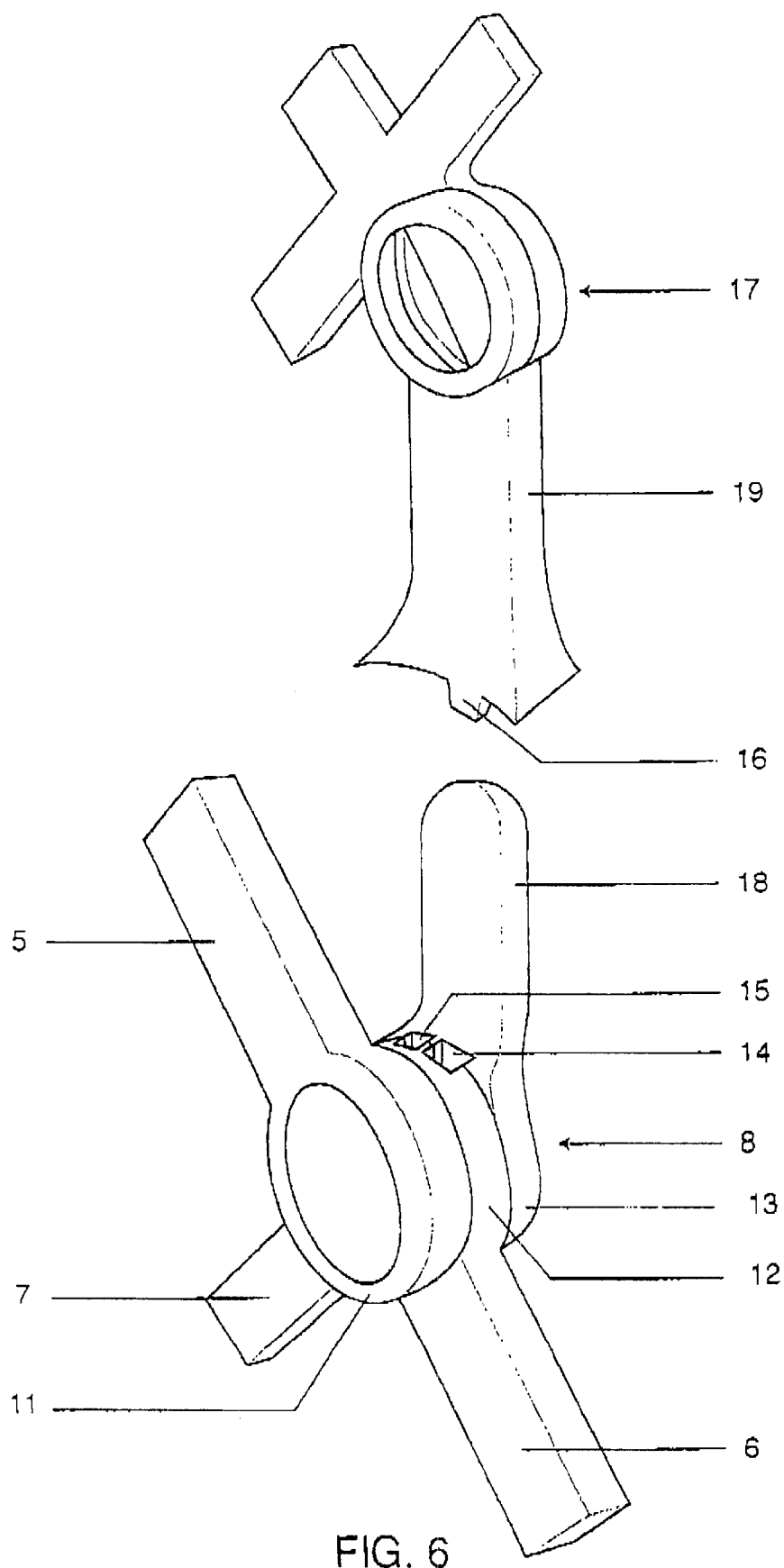
Figure 7:
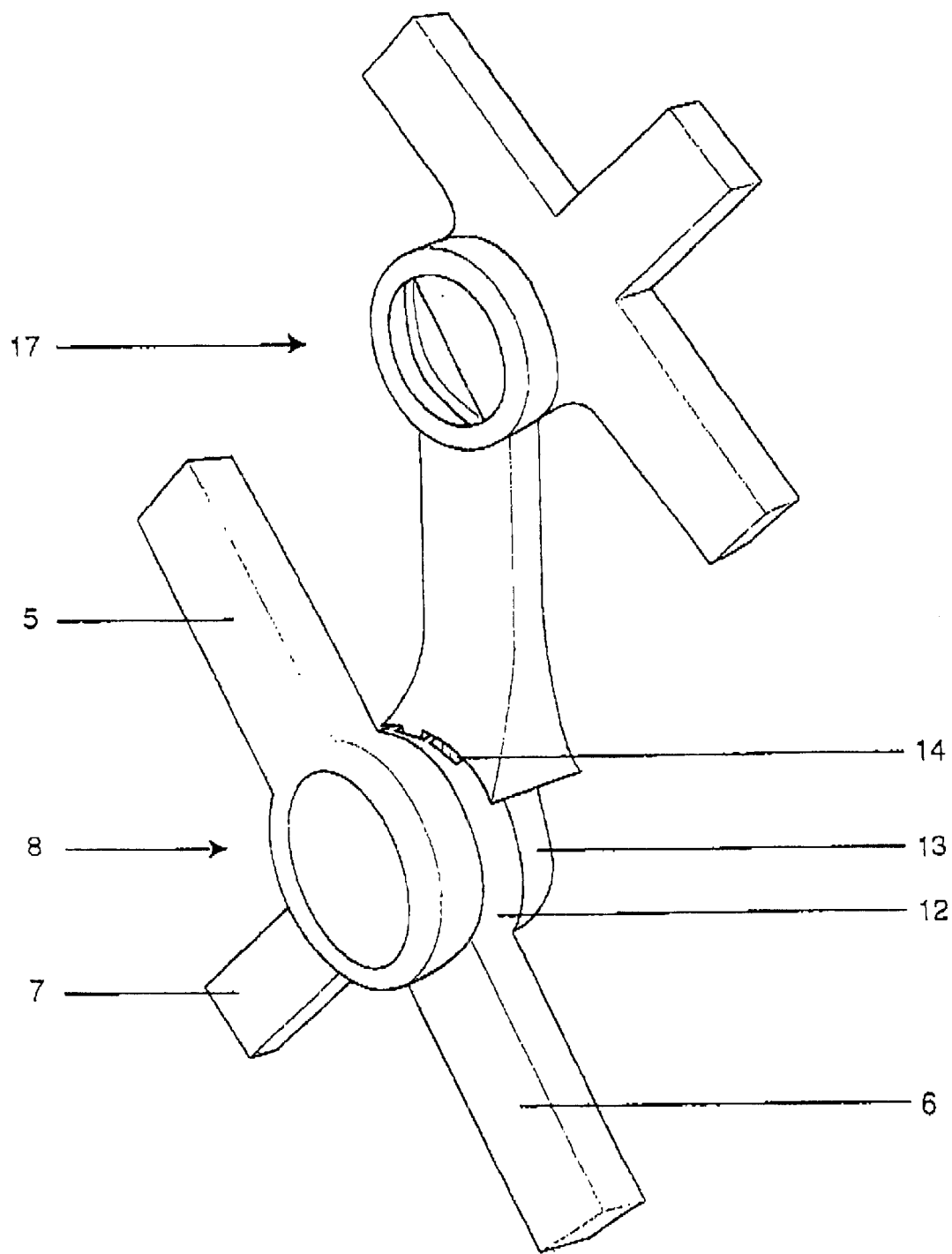
Figure 8:
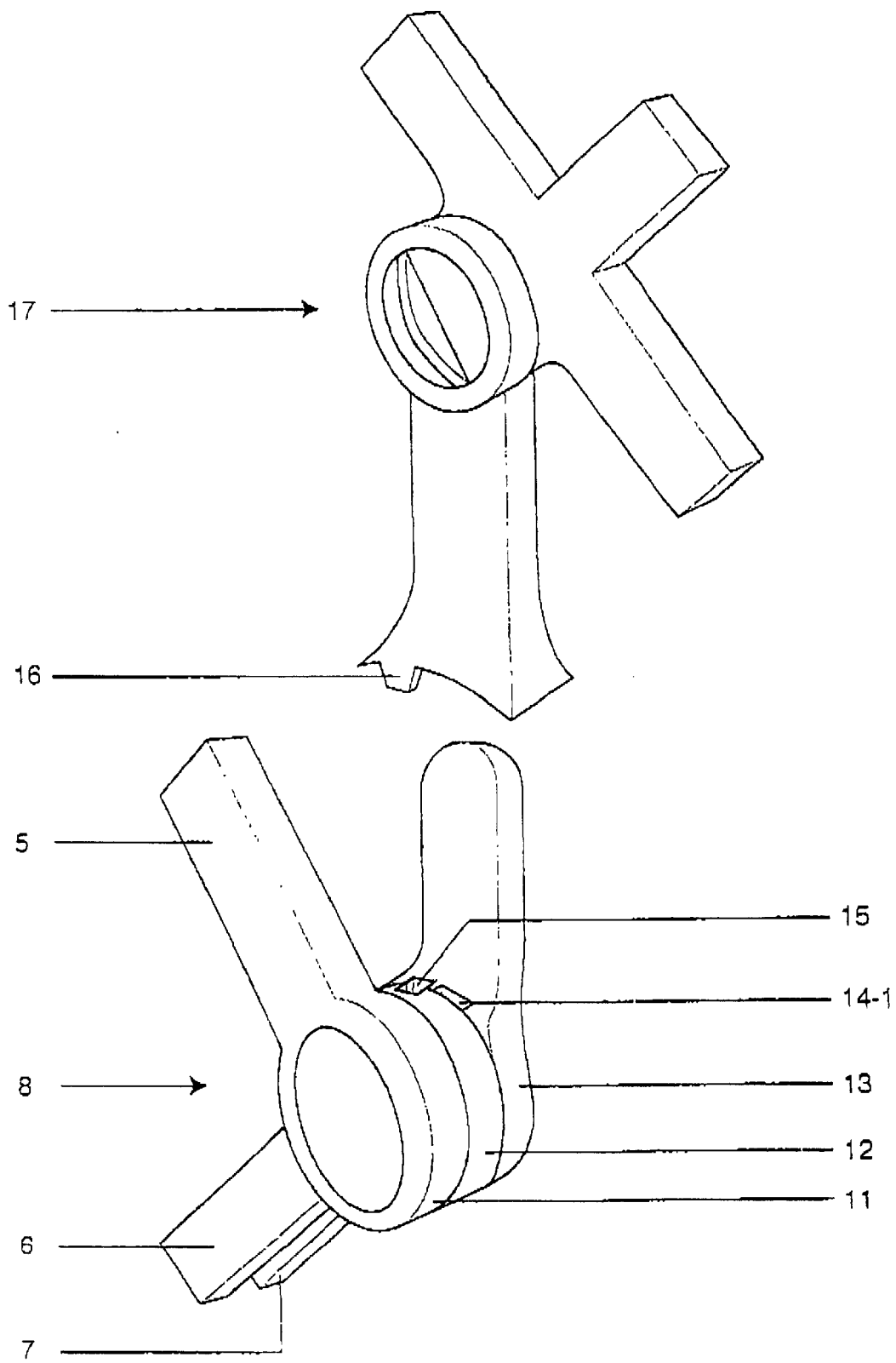

Referring to FIGS. 6, 7 and 8, the preferred form of construction of the coupling device 8 of the buggy according to the invention will now be explained in further detail.

The coupling device 8 is preferably made up of in essence interconnected rotatable discs 11, 12 and 13 which are connected as the case may be to the pull and push bar 5, the front wheel bars 6 and rear wheel bars 7. In both the first position for use of the buggy, in which the coupling device 8 occupies the position shown in FIGS. 6 and 7, and in the second position for use of the buggy according to the invention, in which the coupling device 8 occupies the position shown in FIG. 8, the discs 11, 12 and 13 form at least one recess 14 or 15 that is suitable for taking a projection 16 that is provided on the seat.

FIGS. 6 to 8 show the hinge 17 to which the seat 9 not shown is connected.

The coupling device 8 is preferably arranged so that in the situation of the first position for use as shown in FIGS. 6 and 7 there are two recesses 14 or 15 present that are each suitable for taking the projection 16, In the second position for use, the wheelbarrow position, in which the position of the coupling device 8 is as shown in FIG. 8, there is only one recess 15 present that is suitable for taking the projection 16. There can then also be a recess 14-1 present as shown in FIG. 8, but it is not suitable for taking the projection 16. With this arrangement the seat 9 can only be fitted with its back 10 towards the front and rear wheels 3,4.

FIG. 7 clearly shows that by fitting the seat 9 the projection 16 slots into a recess 15 formed by the discs 11, 12 and 13, as a consequence of which the discs 11, 12 and 13 are secured against mutual rotation.

FIGS. 6, 7, 8, 9A and 9B also clearly show that the coupling device 8 and the seat 9 are provided with a male and female connection 18, 19. It has already been mentioned that the seat 9 is provided on either side with a hinge 17. This hinge 17 can be locked. Through effectuation of the male and female connection 18, 19 the hinge 17 is fixed in one of a predetermined number of intermediate positions, so that the seat 9 is locked against rotation, The hinge 17 is connected to a part 19 of the male and female connection 18, 19 that in a first position of the hinge 17 extends beyond the back 10 of the seat 9. This is shown in FIGS. 4B and 5A.

Figures 5A, 5B:
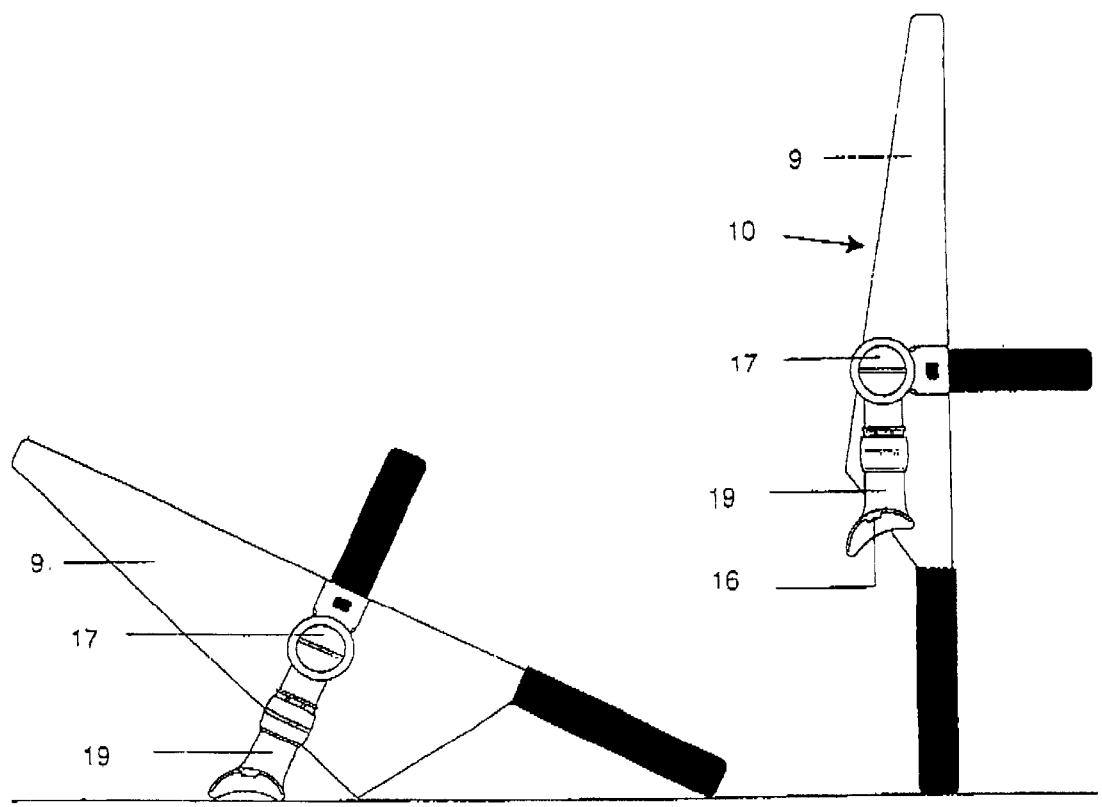
Figures 9A, 9B:
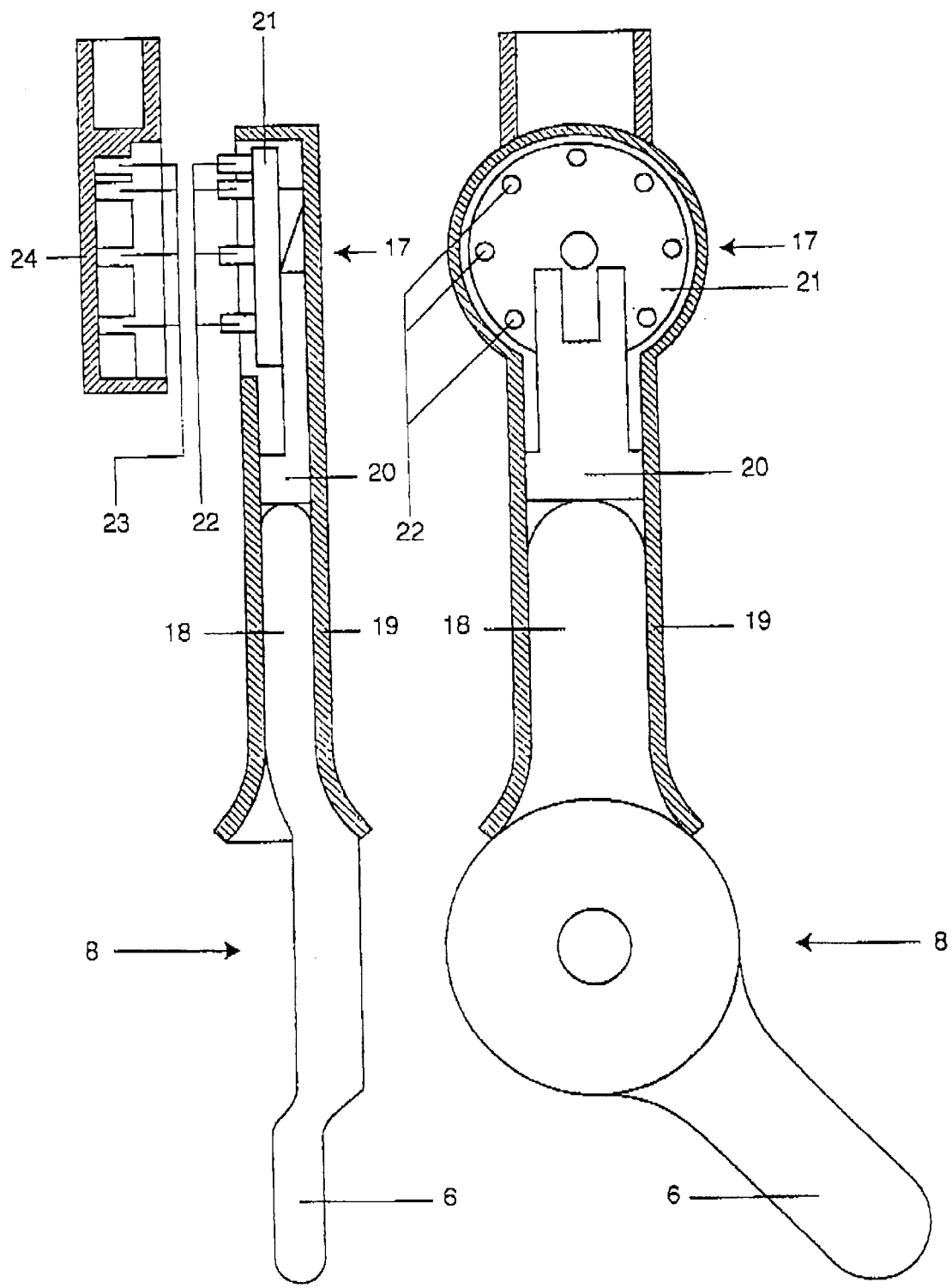

In a second position of the hinge 17 as shown in FIGS. 4C and 5B this part 19 essentially runs parallel to the back 10 of the seat 9, FIGS. 4 and 5 show the seat 9 separately from the coupling device 8 with the male and female connection being broken. Then the hinge 17 is rotatable between the first position according to FIGS. 4B and 5A and the second position according to FIGS. 4C and 5B. The fixed intermediate positions that have been explained above are obtained by effectuating the male and female connection 18, 19. FIGS. 9A and 9B show that when this male and female connection 18, 19 is made, a pawl 20 incorporated into the hinge 17 of the seat 9 is adjusted which adjusts a disc 21 with teeth 22 sideways until these teeth 22 are taken up in recesses 23 of an adjacent disc 24. The discs 21 and 24 are secured against mutual rotation.

The invention is not restricted to the form of construction described, The form of construction described serves merely as a means of explaining the claims below. Variations are possible within the scope of these claims without departing from the thinking behind the invention.

What is claimed is:

1. A buggy comprising:
    a frame with two spaced-apart hinging members;
    a front wheel bar and a rear wheel bar rotatably attached to each of the hinging members to be rotatable around a transverse axis;
    a front wheel supported by each front wheel bar;
    a rear wheel supported by each rear wheel bar;
    a push bar connected to each of the hinging members;
    a seat;
    the hinging members comprising a respective attachment part for releasably receiving the seat;
    the attachment parts comprising locking members for locking the relative movement of the front wheel bars, the rear wheel bars and the push bar; and
    the seat comprising an actuating member for placing the locking members in a locking position upon placement of the seat on the attachment parts and for releasing the locking members upon removal of the seat from the attachment parts;
    the distance between the front wheels being different from the distance between the rear wheels, and
    wherein the buggy can be placed in a first operating position by rotating the front wheel bars and the rear wheel bars with respect to one another around the transverse axis such that the front wheel bars and the rear wheel bars include an angle, and in a second operating position by rotating the front wheel bars and the rear wheel bars with respect to one another around the transverse axis to extend generally parallel, in which second operation position, the front and rear wheels are placed substantially side by side.

2. The buggy according to claim 1, wherein each of the hinging members comprises three adjacent discs connected to the push bar, the front wheel bar and the rear wheel bar respectively, the discs of the front and rear wheel bars being adjacent and comprising a recess, wherein the recesses in the discs of the front and rear wheel bars can receive a projection on the seat to be locked in a relative position.

3. The buggy according to claim 1, wherein in the first operating position, the attachment parts can receive the seat in a forward or rearward facing orientation, and in the second operating position, the attachment parts receive the seat only in a single rearward or forward facing orientation.

4. The buggy according to claim 3, wherein each of the hinging members comprises three adjacent discs connected to the push bar, the front wheel bar and the rear wheel bar respectively, the discs of the front and rear wheel bars being adjacent and comprising a recess, wherein the recesses in the discs of the front and rear wheel bars can receive a projection on the seat to be locked in a relative position.

5. The buggy according to claim 3, wherein each of the hinging members comprises three adjacent discs connected to the push bar, the front wheel bar and rear wheel bar respectively, the discs of the front and the rear wheel bars being adjacent and comprising a recess, wherein the recesses in the discs of the front and rear wheel bars can receive a projection on the seat to be locked in a relative position wherein in the first operating position two recesses in the discs are placed side by side, each recess receiving the projection of the seat in a respective orientation, wherein in the second operating position, a single recess is placed in a position to receive the projection of the seat in a single orientation.

6. The buggy according to claim 1, wherein the seat comprises a female adjustable attachment part for connecting to a male attachment part of each of the hinging members, the female attachment part of the seat being lockable in a number of fixed orientations via the male attachment part.

7. The buggy according to claim 6, wherein the attachment part of the seat comprises a frame part and a rotatable arm having a resilient pawl which pawl can be pressed against the frame part by the male attachment part.

8. The buggy according to claim 7, wherein the rotatable arm of the seat is hingeable between a position in which the arm extends diagonally with respect to a back of the seat, beyond the back, and a second position in which the arm extends substantially parallel to the back of the seat.

* * * * *

UNITED STATES PATENT AND TRADEMARK OFFICE
CERTIFICATE OF CORRECTION

PATENT NO. : 6,513,827 B1  Page 1 of 1
DATED : February 4, 2003
INVENTOR(S) : Machiel Geradus Theodorus Marie Barenbrug It is certified that error appears in the above-identified patent and that said Letters Patent is hereby corrected as shown below:

<u>Title page,</u>
Insert Item [30] as follows:
-- [30] Foreign Application Priority Data
July 28, 1998 (NL) .......................... 109753 --

Signed and Sealed this

Twenty-seventh Day of May, 2003

JAMES E. ROGAN
*Director of the United States Patent and Trademark Office*